April 14, 1959 R. L. DENTON 2,882,404

TRANSISTORIZED FREQUENCY STANDARD

Filed June 24, 1957 3 Sheets-Sheet 1

INVENTOR.
ROBERT L. DENTON
BY
George E. Pearson
ATTORNEYS

INVENTOR.
ROBERT L. DENTON

BY

George E. Pearson

ATTORNEYS

INVENTOR.
ROBERT L. DENTON
BY
George E. Pearson
ATTORNEYS

United States Patent Office 2,882,404

Patented Apr. 14, 1959

2,882,404

TRANSISTORIZED FREQUENCY STANDARD

Robert L. Denton, San Diego, Calif.

Application June 24, 1957, Serial No. 667,723

7 Claims. (Cl. 250—36)

Figure 1A:
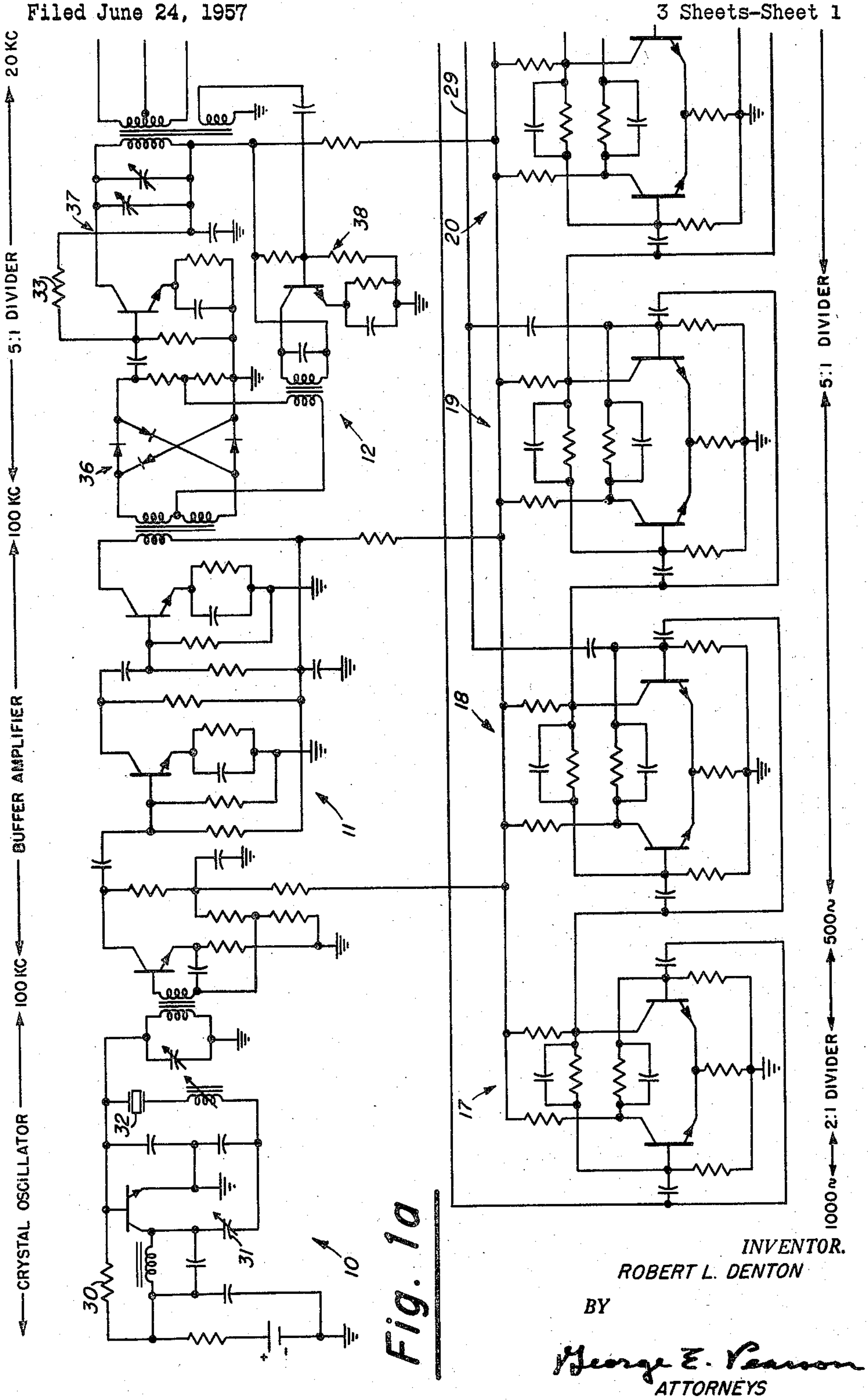

(Granted under Title 35, U. S. Code (1952), sec. 266)

The invention described herein may be manufactured and used by or for the Government of the United States of America for governmental purposes without the payment of any royalties thereon or therefor.

The present invention relates to a transistorized frequency standard and more particularly to a frequency standard in which standardization of frequency is accomplished by means of a crystal oscillator, a series of regenerative frequency dividers, a series of binary dividers, a feedback loop from the output of one of the binary dividers for resetting a portion of the preceding dividers to divide frequency in the ratio of 5:1 rather than by the ratio of 8:1, and a power amplifier driving a 50 C.P.S. electric clock.

Heretofore frequency standards utilizing conventional electron tube circuits were bulky and unduly increased the size of equipment to which they were added. Furthermore such standards required external power sources which further decreased compactness.

The present invention obviates the above difficulties by providing a frequency standard having transistorized circuitry which lends itself to compactness and does not unduly increase the size of the equipment to which it is added. Moreover, the use of transistor circuits eliminates an external power source, since adequate power is supplied by a storage battery source.

An object of the present invention is the provision of an improved transistorized frequency standard.

Another object is to provide an improved transistorized frequency standard having a stability of the order of one part in $10^8$ per day.

A further object of the invention is the provision of an improved frequency standard which furnishes various known frequencies in the audible frequency range.

A further object is the provision of an improved frequency standard which furnishes various known frequencies in the audible frequency range by accurately dividing a predetermined input frequency.

A still further object is to provide a frequency standard which drives an electric clock to be used as an accurate time standard and as a means of comparing the long time accuracy of the frequency standard against other time or frequency standards.

Another object is the provision of a frequency standard which is reliable and capable of operating for long periods of time without the use of an external power source.

A final object of the present invention is the provision of a frequency standard which is compact and can be made part of other equipment without unduly increasing the size of the equipment to which it is added.

Figure 1B:
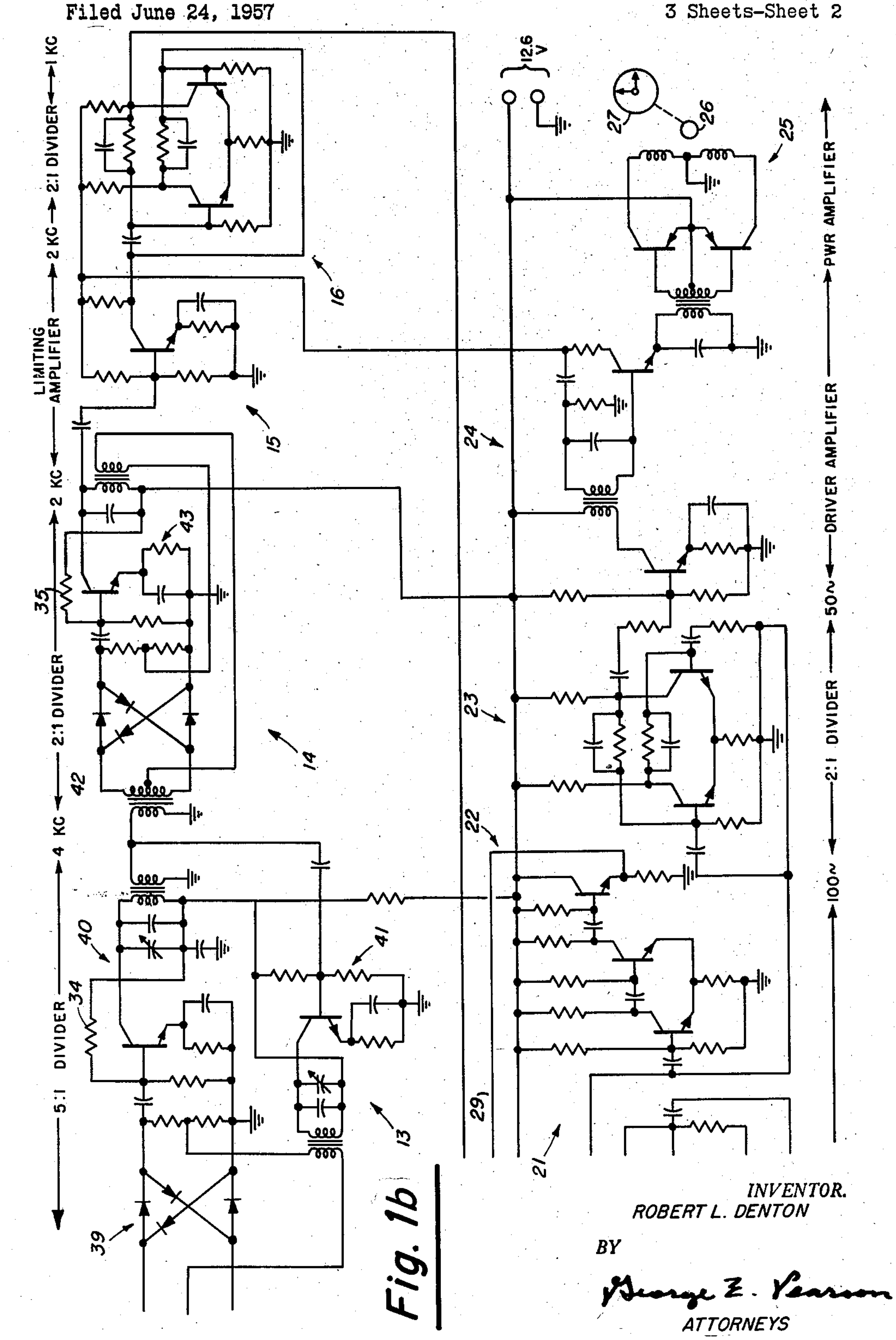
Figure 2:
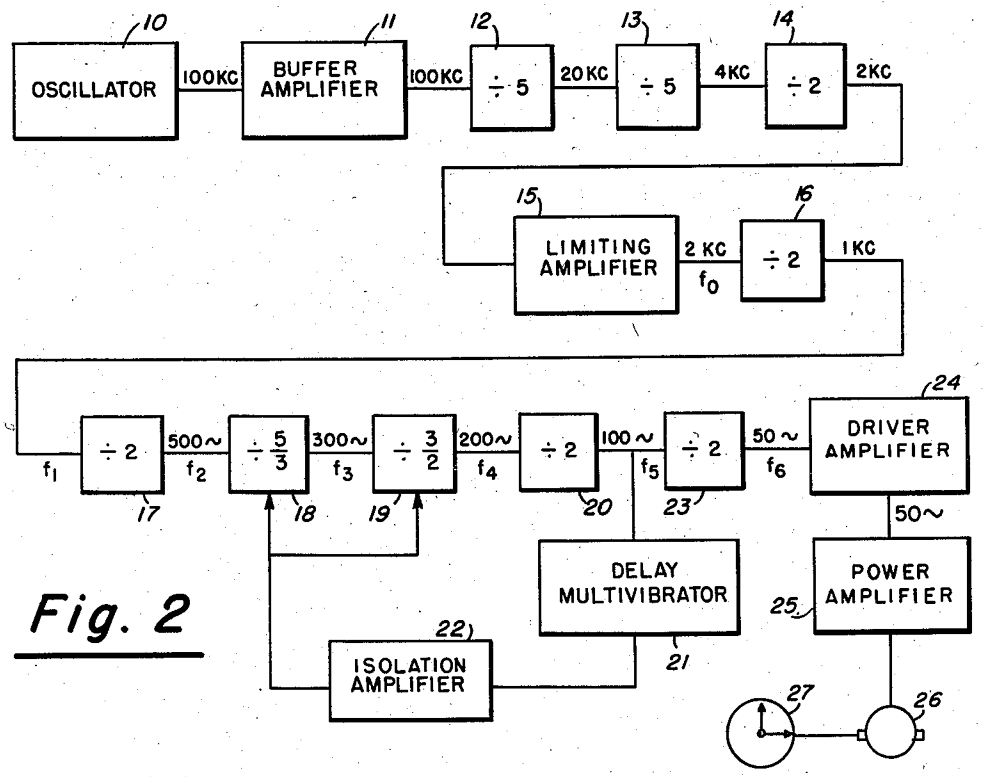
Figure 3:
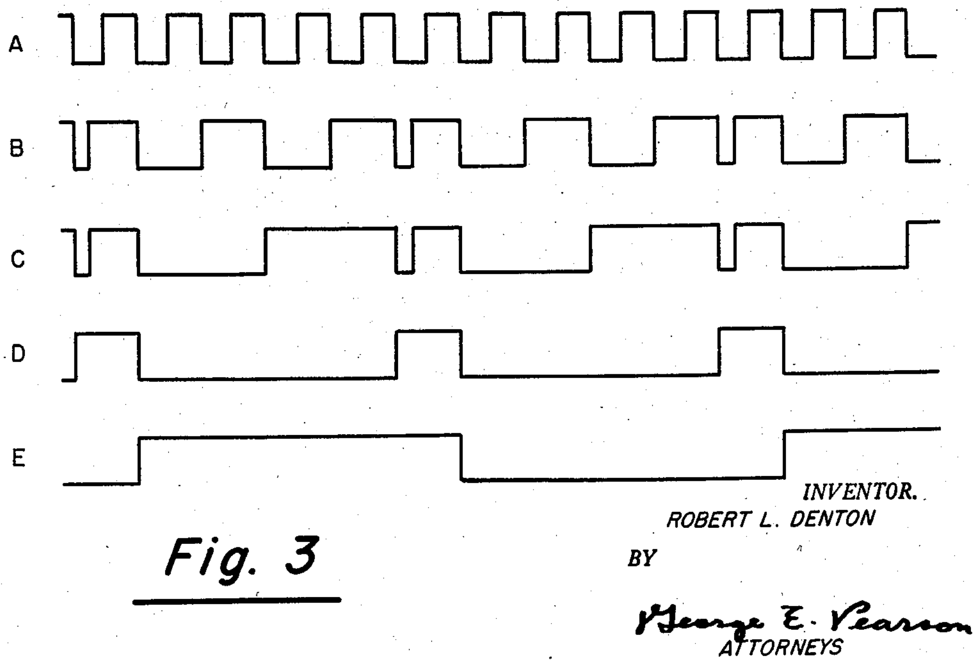

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1*a* is a schematic showing of a portion of the invention;

Fig. 1*b* is a showing in schematic of the rest of the invention;

Fig. 2 shows in block diagram the components of the schematic of Figs. 1*a* and 1*b*; and Fig. 3 shows the wave forms generated by the various stages of the frequency standard of Figs. 1*a*, 1*b*, and 2.

Referring now to the drawings, wherein like reference characters designate like or corresponding parts, there is shown in Figs. 1*a*, 1*b*, and 2 an oscillator 10 for producing a signal of 100 kc. followed by an amplifier 11 having three stages of amplification. Following the amplifier 11 there is a series of regenerative frequency dividers comprising a 5:1 divider 12, a 5:1 divider 13 and a 2:1 divider 14. The divider 12 includes a modulator 36, oscillator 37, and a feedback loop having a frequency multiplier 38. Similarly the divider 13 has a modulator 39, an oscillator 40, and a frequency multiplier 41. The 2:1 divider has a modulator circuit 42 and oscillator 43. The output of the 2:1 divider 14 is connected to a limiting amplifier 15 for producing a square wave form which is differentiated to drive a following series of binary dividers 16, 17, 18, 19, 20, and 23 followed by a driver amplifier 24 and a power amplifier 25 driving a motor 26 which in turn drives the clock 27. A feedback loop 29 is provided from the output of the divider 20 to the dividers 18 and 19 for resetting these dividers such that the dividers 18, 19, and 20 in the aggregate divide the frequency by a 5:1 ratio rather than by an 8:1 ratio. The loop 29 includes a delay multivibrator 21 and an isolation amplifier 22.

In the practice of the invention the oscillator 10 can be as illustrated or of any conventional form to give sufficient output which can be obtained by proper selection of the transistor, resistor 30 and adjustment of the feedback capacitor 31.

The three stages of amplification in the buffer amplifier 11 are conventional wherein the first stage is tuned to 100 kc. to reject any hum or other interference mixing with the low level output of the oscillator. The last stage of amplification has sufficient power output to drive the regenerative divider 12.

The two 5:1 regenerative frequency dividers 12 and 13 are of the type which do not produce an output of the incorrect frequency such as a free running multivibrator or blocking oscillator would do. The dividers 12 and 13 are operated by adjusting the tuned circuits to the correct frequency, ensuring a proper input level and adjusting the resistors 33 and 34 to a value which gives sufficient gain for the dividers to start but considerably less than that required for the circuits to oscillate.

The 2:1 divider 14 which follows the two 5:1 dividers 12 and 13 provides a low order of division allowing the use of only one transistor and one tuned circuit. The adjustment of its bias resistor 35 is much less critical than are the same adjustments on the 5:1 dividers.

The operation of the frequency standard is as follows: A 100 kc. signal produced by the oscillator 10 in the oscillator 10 in the regenerative divider chain is amplified by the amplifier 11 then introduced into the modulator portion 36 of the divider 12. The oscillator 37 has a frequency of 20 kc. which is applied to the frequency multiplier 38 wherein it is multiplied to a frequency of 80 kc. and introduced into the modulator 36. The difference frequency of 20 kc. is filtered then applied to the oscillator 12 as a synchronizing signal. Thus the stable state of the divider 12 is that in which the synchronizing frequency is equal to the oscillator frequency and the output frequency is exactly 20 kc. Similarly the 20 kc. output of the divider 12 is applied to the divider 13 wherein it is divided in the ratio of 5 to 1 to provide an output signal of 4 kc. The output signal of the divider 13 is further divided by the 2:1 divider 14 to provide a 2 kc. signal which is differentiated the isolating amplifier 15 to produce a square wave form which is introduced into the binary frequency divider chain where it is divided by divider 16 to produce a 1 kc. signal which is further divided successively by the dividers 17, 18, 19, and 20 to produce signals of 500, 300, 200, and 100 cycles per second, respectively, corresponding to the wave forms shown at A, B, C, and D in Fig. 3.

The feedback loop 29 produces the above division by resetting the dividers 18 and 19 such that the dividers 18, 19, and 20 in the aggregate divide the frequency by 5 instead of 8 as follows by referring to Fig. 3:

$$f_3=\frac{f_2+f_5}{2} \qquad (1)$$

$$f_4=\frac{f_3+f_5}{2} \qquad (2)$$

$$f_5=\frac{f_4}{2} \qquad (3)$$

Substituting Equations 1 and 2 in Equation 3

$$f_5=\frac{\frac{\frac{f_2+f_5}{2}+f_5}{2}}{2}=\frac{f_2}{5}$$

In this case $f_2$ is 500 cycles per second and $f_5$ is 100 cycles per second.

A further division by the divider 23 divides the 100 cycle per second signal to produce a 50 cycle per second signal, as shown at E in Fig. 3, which is amplified by the driver and power amplifiers 24 and 25 to operate the motor 26 which in turn operates the clock 27.

Obviously, many modifications and variations of the present invention are possible in the light of the above teachings. It is therefore to be understood that within the scope of the appended claims, the invention may be practiced otherwise than as specifically described.

What is claimed is:

1. A transistorized frequency standard comprising first transistor circuit means for generating a first sinusoidal signal having a predetermined frequency, second transistor circuit means responsive to said first signal for providing a second sinusoidal signal having a frequency which is a sub-multiple of said predetermined frequency, third transistor circuit means for differentiating said second signal to provide a third signal having a square wave form and a frequency equal to that of said second signal, fourth transistor circuit means including a series of binary frequency dividers responsive to said third signal for providing a fourth signal having a frequency which is a sub-multiple of the frequency of said third signal, said dividers including means for introducing said fourth signal into each of a pair of said dividers, and means responsive to said fourth signal for actuating a frequency responsive timing apparatus.

2. A transistorized frequency standard comprising first transistor circuit means for generating a first sinusoidal signal having a predetermined frequency, second transistor circuit means responsive to said first signal for providing a second sinusoidal signal having a frequency which is a sub-multiple of said predetermined frequency, said second transistor circuit means including a series of frequency dividers, third transistor circuit means for differentiating said second signal to provide a third signal having a square wave form and a frequency equal to that of said second signal, fourth transistor circuit means responsive to said third signal for providing a fourth signal which is a sub-multiple of the frequency of said third signal, said fourth transistor circuit means including means for introducing said fourth signal into a portion of said fourth transistor circuit means, and means responsive to said fourth signal for actuating a frequency responsive timing apparatus.

3. A transistorized frequency standard comprising first transistor circuit means for generating a first sinusoidal signal having a predetermined frequency, second transistor circuit means including a series of frequency dividers responsive to said first signal for providing a second sinusoidal signal having a frequency which is a sub-multiple of said predetermined frequency, third transistor circuit means for differentiating said second signal to provide a third signal having a square wave form and a frequency equal to that of said second signal, fourth transistor circuit means including a series of binary frequency dividers responsive to said third signal for providing a fourth signal having a frequency which is a submultiple of the frequency of said third signal, said binary frequency dividers including means for introducing said fourth signal into each of a pair of said binary frequency dividers, and means responsive to said fourth signal for actuating a frequency responsive timing apparatus.

4. A transistorized frequency standard as set forth in claim 3 wherein each of a pair of said frequency dividers comprises synchronized oscillator means for producing an output signal of predetermined frequency.

5. A transistorized frequency standard as set forth in claim 3 wherein each of a pair of said frequency dividers comprises oscillator means for producing an output signal of predetermined frequency, means for multiplying the frequency of said output signal, and means for introducing said multiplied signal into the input of said oscillator means for synchronizing said oscillator means.

6. A transistorized frequency standard as set forth in claim 3 wherein each of a pair of said frequency dividers comprises oscillator means for producing an output signal of predetermined frequency, and means for synchronizing said oscillator means.

7. A transistorized frequency standard as set forth in claim 6 wherein said synchronizing means comprises means for introducing said output signal into the input of said oscillator means.

No references cited.